US011260555B2

(12) United States Patent
Benstead et al.

(10) Patent No.: US 11,260,555 B2
(45) Date of Patent: Mar. 1, 2022

(54) METHOD FOR CONTINUOUS ACETYLATION OF WOOD ELEMENTS

(71) Applicant: Tricoya Technologies Ltd, London (GB)

(72) Inventors: Stephen John Benstead, London (GB); Theodorus Gerardus Marinus Maria Kappen, London (GB)

(73) Assignee: TRICOYA TECHNOLOGIES LTD., London (GB)

( * ) Notice: Subject to any disclaimer, the term of this patent is extended or adjusted under 35 U.S.C. 154(b) by 13 days.

(21) Appl. No.: 16/702,770

(22) Filed: Dec. 4, 2019

(65) Prior Publication Data

US 2020/0101635 A1 Apr. 2, 2020

Related U.S. Application Data

(63) Continuation of application No. 15/565,310, filed on Oct. 9, 2017, now abandoned.

(51) Int. Cl.
| | | |
|---|---|---|
| *B27K 3/34* | (2006.01) | |
| *B27K 3/02* | (2006.01) | |
| *B27K 5/00* | (2006.01) | |
| *C08H 8/00* | (2010.01) | |
| *C08B 3/06* | (2006.01) | |
| *B27K 3/08* | (2006.01) | |

(52) U.S. Cl.
CPC ............ *B27K 3/346* (2013.01); *B27K 3/0207* (2013.01); *B27K 3/0228* (2013.01); *B27K 3/0271* (2013.01); *B27K 3/0278* (2013.01); *B27K 3/08* (2013.01); *B27K 5/001* (2013.01); *C08B 3/06* (2013.01); *C08H 8/00* (2013.01)

(58) Field of Classification Search
CPC .............................. B27K 3/346; B27K 3/0207
See application file for complete search history.

(56) References Cited

U.S. PATENT DOCUMENTS

| 709,799 | A | 9/1902 | Ruping |
|---|---|---|---|
| 5,431,868 | A | 7/1995 | Hirano |
| 5,525,721 | A | 6/1996 | Ohshima |
| 5,608,051 | A | 3/1997 | Nelson |
| 5,821,359 | A | 10/1998 | Nelson |
| 6,217,939 | B1 | 4/2001 | Sailer |
| 2015/0051386 | A1 | 2/2015 | Pol |
| 2015/0050483 | A1 | 5/2015 | Pol |
| 2017/0173819 | A1 | 6/2017 | Turnbull |
| 2017/0203467 | A1 | 7/2017 | Pol |
| 2018/0093390 | A1 | 4/2018 | Marissal |

FOREIGN PATENT DOCUMENTS

| CN | 1104218 | 10/1994 |
|---|---|---|
| CN | 101224593 | 2/2008 |
| CN | 103659967 | 9/2012 |
| EP | 0 650 998 A1 | 3/1995 |
| EP | 0680810 A1 | 5/1995 |
| GB | 2456915 A | 8/2009 |
| WO | 2011095824 A1 | 8/2011 |
| WO | 2013117641 A1 | 8/2013 |
| WO | 2013139937 A1 | 9/2013 |
| WO | 2013175420 A1 | 11/2013 |
| WO | 2015173226 | 11/2015 |

OTHER PUBLICATIONS

Report for current situation and tendency of patented technologies in industry (2012-2013), Yuncai Zhang et al., Intellectual Property Publishing House, p. 109, Jan. 2013.
Wood Technology, BAHMH, China Forestry Publishing, p. 262, May 1958.
Research and development of wood science and technology, Biguang Zhang et al., China Environmental Science Press, p. 160, Jan. 2004.
Wood preservation, B. A. Richardson, China Forestry Publishing, pp. 140-143, Sep. 1982.

*Primary Examiner* — Liam J Heincer
(74) *Attorney, Agent, or Firm* — Innovation Capital Law Group, LLP; Vic Lin

(57) ABSTRACT

The disclosure relates to a method for continuous acetylation of wood elements. The acetylation is conducted with an acetylation medium at a pressure of at least 1.5 barg in a substantially oxygen free environment. Alternatively, the method includes the steps of: (a) feeding wood elements in a substantially oxygen free environment to a continuous acetylation reactor, and (b) treating the wood elements with an acetylation medium in the continuous acetylation reactor under wood acetylation reaction conditions, at a pressure of at least 1.5 barg. The process can acetylate wood elements to a high acetyl content in an efficient way, without compromising on the quality of the material. The acetylated wood elements can be used in the production of medium density fibreboards with superior qualities such as dimensional stability and durability.

10 Claims, No Drawings

METHOD FOR CONTINUOUS ACETYLATION OF WOOD ELEMENTS

RELATED APPLICATIONS

This application is a continuation of U.S. Ser. No. 15/565,310, filed Oct. 9, 2017, which in turn is a 371 of PCT/EP2016/058150.

TECHNICAL FIELD

This disclosure relates to the field of wood acetylation. Particularly, the disclosure provides a method for continuous acetylation of wood elements.

BACKGROUND

It has been known in the art to chemically modify wood with the aim to improve its service life and particularly to acetylate wood. Thereby materials with improved material properties, e.g. dimensional stability, hardness, durability, are obtained.

In the art, it is known to use batch processes, i.e. non steady state processes for the acetylation of wood particles. Such processes, however, often lead to poor product uniformity as the properties differ significantly during the cycle of each batch and potentially from batch to batch. Since long term steady state conditions are not established, no two batches can ever be considered as identical.

Some references address the option to conduct wood acetylation in a continuous process. EP 0746570 discloses a process for the acetylation of lignocellulosic materials (LM) comprising a first step wherein the LM is brought into intimate contact with an acetylating agent comprising acetic anhydride as the major component at a temperature from 80° C. to 140° C. and bringing the acetylated LM from the first step into contact with a heated gas inert under the reaction conditions in a stripper at a temperature above 140° C. A comparable process is described in EP 0650998.

In the acetylation of wood elements, particularly of wood chips, a technical challenge in providing a suitable continuous process, is to combine the advantages of a continuous process, with the desired result of a sufficiently high degree and uniformity of acetylation.

It is notoriously difficult to obtain acetylation degrees in terms of acetyl content higher than 17 wt. % for wood elements. It should be noted that the acetylation degree used in the present disclosure is measured as an acetyl content (AC) in contrast to weight percentage gain (WPG). In the art, acetyl contents higher than 17 wt. % are typically obtained via catalyzed processes. In catalyzed acetylation processes, a catalyst for the acetylation reaction is added to the wood. These are frequently toxic organic substances, such as pyridine, but also sodium bicarbonate, potassium acetate, and other salts, particularly acetate salts are known. The disclosure aims at providing a non-catalyzed process, thus avoiding the drawback of having residues of additional foreign substances (viz. the catalyst) remain in the wood.

The present disclosure aims to provide a method for the acetylation of wood elements, which is fast and hence cost-effective over batch processes, and at the same time allows the obtaining of wood elements consistent in quality (high acetyl content, no discolorations of the elements). The acetylated wood elements should have a high quality, e.g. to be used in the production of medium density fibreboards possessing superior properties such as dimensional stability and durability. Particularly, the disclosure also aims to provide a continuous acetylation process that enables the production of all wood elements having a relatively high degree of acetylation.

BRIEF SUMMARY

In order to better address one or more of the foregoing desires, the disclosure presents, in one aspect, a method for continuous acetylation of wood elements, wherein the acetylation is conducted with an acetylation medium at a pressure of at least 1.5 barg in a substantially oxygen free environment.

In another aspect, the disclosure presents a method for continuous acetylation of wood elements comprising the steps of:

(a) feeding wood elements in a substantially oxygen free environment to a continuous acetylation reactor, (b) treating the wood elements with an acetylation medium in the continuous acetylation reactor under wood acetylation reaction conditions, at a pressure of at least 1.5 barg.

DETAILED DESCRIPTION

The disclosure, in a broad sense, is based on the unexpected finding that it is possible to obtain acetylation wood elements with a high acetyl content and excellent wood quality in an efficient continuous acetylation process, for example using a residence time of less than one hour. This is achieved by the combined effect of the acetylation conditions used (particularly, high pressures), a low oxygen, preferably a substantially oxygen-free, environment and a continuous manner of performing the acetylation reaction.

Pressures higher than 0.5 barg are rarely used in the acetylation of wood. A common belief is that such high pressures in combination with high temperatures could damage the wood and lead to a lower quality, e.g. change in colour and strength of the acetylated wood elements. In the present disclosure this is however obviated by performing the acetylation in a reduced oxygen environment, for example by removing the oxygen from the wood elements before the acetylation.

In an embodiment, the wood elements to be acetylated have a moisture content of at most 6 wt. %, more preferably at most 4 wt. % or even at most 3 wt. %. The morphology of the wood elements may be, but is not limited to, wood chips, wood fibres, wood flower, wood strands, wood shavings, etc. In a preferred embodiment, the wood elements are wood chips. The wood elements can belong to non-durable wood species such as soft woods, for example, coniferous trees, spruce, pine or fir or to non-durable hardwoods, typically beech, birch, eucalyptus, poplar or alder. In embodiments, the wood elements have a size of a height and width from 0.1 cm to 3 cm, and a length of 1 to 7 cm, and are more preferably have dimensions of approximately 2 to 3 cm×1 to 2 cm×1 to 2 cm in size, ideally approximately 2.5 cm×1.5 cm×1.5 cm in size.

After chipping the trees, the green wood elements have a typical natural moisture content (MC) of >100 wt. % based on the dry weight. The moisture content of the elements is preferably lowered to below 6 wt. % dry weight, before the elements are treated in the acetylation process. At higher moisture contents too much of the acetylation medium (typically containing acetic anhydride) will be consumed in a reaction with water in the wood instead of with the hydroxyl groups in the wood, which makes the acetylation process less efficient. Another disadvantage of a too high MC is that the strong exothermic reaction of acetic anhydride with water in the wood can lead to local overheating in the wood and discoloration of the wood elements may occur. In some embodiments, the moisture content is less than 4 wt. %, ideally less than 3 wt. %. Lowering of the moisture content can be achieved by conventional continuous or batch drying techniques. In a particular embodiment, wood elements are dried in a continuous process and the dried elements are stored in a (blanketed) silo. A batch of these dried elements may be taken in order to prepare for the next step.

The method according to the disclosure involves conducting the acetylation reaction in a substantially oxygen free environment, preferably conducting the acetylation reaction in a reactor having an oxygen concentration of less than 1 vol. %.

In some embodiments, the wood elements fed to the acetylation reaction are in a substantially oxygen free environment. The oxygen content of the wood elements fed to the acetylation reactor is, in certain embodiments, less than 1 vol. %, more preferably less than 0.8 vol. %, yet more preferably less than 0.5 vol. %. The oxygen may be removed by creating a vacuum, pressure cycling, purging with an inert gas (such as nitrogen) or with a combination of these. In practice, wood elements can be placed in a vessel, which is evacuated to reach a certain vacuum level. Suitable pressures for applying vacuum are 100 mbar or less, preferably 70 mbar or less, more preferably 50 mbar or less. Typically, a vacuum of 100 mbar absolute or less is sufficient to remove the oxygen from the wood elements to a sufficiently low level in order to subsequently realize a low oxygen, and preferably a substantially oxygen-free, environment in the acetylation reactor. It is not sufficient to only remove oxygen from the gaseous environment of the wood elements as potentially some oxygen can still be present between or within the wood elements. In embodiments, substantially all the gaseous oxygen is removed from the wood elements.

In other embodiments, the substantially oxygen free environment is defined as having art oxygen content in the acetylation reactor below 1 vol. %, preferably below 0.8 vol. %, more preferably below 0.5 vol. % or even below 0.4 vol. %. The oxygen content can suitably be measured on the effluent from the reactor.

Without wishing to be bound by a particular theory, it is believed that low oxygen content during acetylation prevents wood from excessive oxidation that takes place at high temperatures and high acetylation pressures used. Such oxidation could lead to darkened but also less strong wood fibers. In addition, low oxygen, and preferably substantially oxygen-free, environment contributes to a safe and stable working of the acetylation medium during the acetylation reaction, wherein the acetylation medium is preferably recycled and re-used. The acetylation reaction and the associated quality of the resultant wood product is particularly enhanced when the wood introduced to the acetylation reactor has both a low oxygen and a low moisture content.

The step of removal of oxygen is typically carried out batch-wise. In a preferred embodiment, the wood elements are vacuumed in a hopper and after the vacuum step are brought under inert atmosphere, preferably, of nitrogen. The wood elements can be further purged, optionally pressure purged, with inert, preferably nitrogen, gas or with vapours of the acetylating medium.

If the step of oxygen removal is carried out batch-wise, it will typically be necessary to arrange for a transition between the batch step and the continuous acetylation. Care should be taken not to introduce oxygen during such transition into the environment of the wood elements. The transition step is carried out under inert atmosphere, preferably nitrogen. The transition can be done by transferring a batch of wood elements into a hopper with a continuous discharging device (e.g. screw at the bottom of the hopper) that continuously feeds to the acetylation reactor. Preferably, the wood elements are continuously discharged from the screw at the bottom of the hopper to a rotary valve set-up. Such a rotary valve set-up may comprise one or multiply rotary valves, with a variety of purging options through or upstream/downstream of any rotary valve. The rotary valve set-up can then be designed to control the interface between inert nitrogen (upstream of the rotary valve set-up) and hydrocarbon containing (downstream of the rotary valve set-up) atmosphere. The separation between the upstream and downstream atmospheres is maintained by setting appropriate pressure differences, and if necessary purge streams, over the rotary valve set-up. In this way a continuous feed from the upstream, optionally batch, part of the process to the continuous acetylation step can be made, without introducing oxygen into the reaction environment.

In one embodiment, oxygen is removed first by applying vacuum to the wood elements and subsequently applying inert atmosphere, preferably of nitrogen, to the wood elements to replace the air inside and between the elements with the inert gas or gases.

In some embodiments, in addition to the low oxygen environment, it is also preferred to have a low nitrogen environment during the acetylation. Particularly, it can be achieved by removing nitrogen from the wood elements before the acetylation step. Nitrogen (or other inert gas or gases) used to remove the oxygen from the elements, can then be replaced, e.g., with the gaseous acetylation medium. An advantage of this embodiment is that the gaseous acetylation medium has a higher thermal capacity than nitrogen and therefore provides for a more effective heating of the wood elements during the acetylation. The nitrogen content in the reactor can be, in some embodiments, less than 1 vol. %, preferably less than 0.8 vol. %, more preferably less than 0.5 vol. %, as measured on the effluent from the reactor. The removal of nitrogen can be realized by applying vacuum.

In an embodiment, the wood elements after the removal of oxygen (and optionally moisture and/or nitrogen) are brought under increased pressure before the acetylation, preferably at least 1.5 barg.

In a following step, the wood elements are treated with an acetylation medium in a continuous acetylation reactor under wood acetylation reaction conditions to obtain acetylated wood elements. It is an advantage of the present disclosure that no pre-impregnation step upstream of the reactor is necessary and the wood elements can be directly acetylated in the acetylation reactor, which leads to more a streamlined process. In embodiments, substantially all of the acetylation medium is supplied to the wood elements after they are at a pressure of at least 1.5 barg. Substantially means here the majority of the acetylation medium introduced for acetylation, preferably at least 80 wt. %, more preferably at least 90 wt. %, yet more preferable at least 95 wt. %.

In some embodiments, the method comprises the steps of providing wood elements, removing oxygen from the wood elements, feeding the wood elements in a substantially oxygen free continuous acetylation reactor, treating the wood elements with an acetylation medium in the continuous acetylation reactor under wood acetylation reaction conditions at a pressure of at least 1.5 barg. Preferably, substantially all of the acetylation medium is supplied to the wood elements after they are at a pressure of at least 1.5 barg.

Under "wood acetylation reaction conditions" it is understood the conditions under which the wood undergoes acetylation. In some embodiments, the acetylation conditions comprise heating to a temperature in the ranges 150-220° C. or 150-200° C., preferably 160-190° C., alternatively 165-185° C. or 160-180° C., or even 170-200° C. Preferably, the residence time in the acetylation reactor is under 1 hour, more preferably in the range 10-50 min. Preferably, the pressure in the acetylation reactor is in the range 1.5-5 barg, more preferably 2-3.5 barg. In certain embodiments, the acetylation reaction is conducted substantially in the absence of catalyst.

It has been found that when judiciously bringing, ideally pre-conditioned, wood elements fed to an acetylation reactor to the desired temperature and optionally a certain degree of saturation of the wood elements for the acetylation reaction it is possible to maintain good product properties with a much shorter minimum residence time in the reactor achieved by substantially all the wood elements than had previously been considered possible. In this specification "pre-conditioned" means being substantially oxygen-free (as previously defined) and optionally also being substantially free of one or more of nitrogen, moisture and absorbed hydrocarbons.

Under "acetylation medium" it is understood a chemical compound or a mixture of compounds that is able to acetylate hydroxyl groups in the wood. Preferably, the acetylation medium comprises acetic acid, acetic anhydride or a mixture thereof. More preferably, the acetylation medium comprises a mixture of acetic acid and acetic anhydride. Particularly, such mixture—on feeding into the acetylation reactor—can in some embodiments comprise at least 50 wt. %, more preferably at least 85 wt. % of acetic anhydride.

A feature of the process is that it is a continuous process. In one embodiment, order to minimise the residence time and residence time distribution of a continuous acetylation reactor, preferably a plug flow or "first in first out" principle is employed. In a preferred embodiment the plug flow or "first in first out" principle is fulfilled by using a screw conveyor, preferably substantially filled with the wood elements. Due to the gentle rotation of the screw the wood elements are prevented from attrition. This results in good wood element quality during the process. In one embodiment, a vertical cylinder is mounted on top of the entrance of the screw and by constantly having a level in this vertical cylinder the (nearly) horizontal screw is substantially filled, preferably as completely as possible, that is, at least 80 vol. %, more preferably at least 90 vol. %, yet more preferably at least 95 vol. % of the available volume in the screw. This is beneficial as it prevents by-passing of the heating gas, which is co-current with the wood elements flow.

Another feature of the present process is a short residence time in the acetylation reactor. "Residence time" means here the time that substantially all of the wood elements spend in the acetylation reactor, from the point where they enter the reactor to the point the acetylated elements leave the reactor. In this case substantially all wood elements is defined as at least 80 wt. %, preferably at least 90 wt. %, more preferably at least 95 wt. %, most preferably at least 99 wt. %.

The reactor may have different zones, e.g. a preparation zone, an acetylation reaction zone (A). The residence time in the reactor will then be a sum of the residence times in different zones of the reactor. Preferably, the wood elements have a residence time of less than 1 hour in the acetylation reactor. More preferably, the residence time in the acetylation reactor is in the range 10-50 min.

In one embodiment, wood elements are transported through the reactor in substantially plug flow, optionally using the screw, with a well-defined residence time (typically 20 to 40 minutes, such as about 20 minutes, 25 minutes, 30 minutes, 35 minutes or 40 minutes) and residence time distribution (preferably, substantially all wood elements have a minimum residence time). Alternatively the reactor is designed such that substantially all wood elements have a minimum residence time of at least 5 to 60 minutes, preferably 10-50 minutes, typically 20-40 minutes, such as about 20 minutes, 25 minutes, 30 minutes, 35 minutes or 40 minutes. In this case substantially all wood elements have a minimum residence time defined as at least 90 wt. %, preferably at least 95 wt. %, more preferably at least 97 wt. %, most preferably at least 99 wt. % of all wood elements have the required minimum residence time.

In a certain embodiments, the wood elements having a temperature within +/−15° C. of the set-point temperature of the desired acetylation reaction are introduced into acetylation reaction zone (A) having a pressure of at least 1.5 barg and a residence time of under 1 hour. Preferably, the wood elements have a minimum degree of absorption with the acetylation medium, as defined below, before entering acetylation reaction zone (A), more preferably, the wood elements are saturated in the acetylation medium.

In some embodiments, the majority of the (liquid and/or vapour) acetylation medium is added to the reactor upstream of acetylation reaction zone (A). Alternatively or additionally, the majority of the acetylation medium is supplied to the wood elements after they are at a pressure of at least 1.5 barg. Majority means here at least 70 wt. %, more preferably at least 80 wt. %, yet more preferably at least 90 wt. % of the total acetylation medium introduced into the acetylation reactor. Most preferably, substantially all of liquid and/or vapour acetylation medium is introduced to the reactor upstream of acetylation reaction zone (A) and/or after the wood elements are at a pressure of at least 1.5 barg. Preferably, the average residence time in acetylation reaction zone (A) is greater than 65%, alternatively greater than 75%, preferably greater than 80%, most preferably greater than 85% of the residence time of the acetylation reactor.

A feature of the process is the heat management of the wood elements during the acetylation step. The heating is preferably done by using acetylation medium in vapour form. Preferably, the temperature of the acetylation vapour on introduction into the reactor is within 10-35° C. of the desired temperature for the acetylation process, e.g. which can preferably be 160-190° C. The deviation from this desired temperature can lie within 10-35° C. but preferably no more than 30° C. above the set-point temperature for the acetylation reaction in question. The acetylation medium is preferably an acetic acid/acetic anhydride mix, which is preferably rich in acetic anhydride, such as comprising >85 wt. %, preferably >90 wt. % acetic anhydride. Without wishing to be bound by theory, the inventors believe that the condensation of this vapour mix onto the relatively cool wood elements leads to a rapid and effective heating of the wood, which makes efficient use of the residence time of the acetylation reactor.

Another part of the acetylation medium is preferably supplied in a liquid form. The liquid acetylation medium is preferably an acetic acid/acetic anhydride mix, which is preferably rich in acetic anhydride, such as comprising >85 wt. %, preferably >90 wt. % acetic anhydride. The liquid acetylation medium is preferably brought in direct contact with the wood elements in the reactor, which can be done e.g. by spraying of the liquid on the wood elements.

In one embodiment, the temperature of the acetylation liquid on introduction into the reactor is within 10-35° C. of the bubble point at acetylation reaction conditions, e.g. which can preferably be 160-190° C. and 1.5-5 barg. In an embodiment, the temperature of the acetylation liquid on introduction into the reactor is between 0° C. and 50° C., ideally between 10° C. and 30° C., or alternatively at ambient temperature. It has been found to be important that the wood elements are only heated to within 10-35° C. of the desired temperature for the acetylation process once the wood elements have achieved a preferred minimum absorption of acetylation medium.

While not absolutely necessary, it is advantageous if the wood elements have a minimum absorption of the acetylation medium before being subjected to acetylation reaction conditions. Such minimum absorption can for example be 10 wt. %, more preferably 20 wt. %. Particularly good results are achieved when the wood elements contain at least 30 wt. %, more preferably 40-60 wt. % of the liquid acetylation medium, based on the dry weight of the elements.

Without wishing to be bound by theory, it is believed that adding the acetylation medium in the liquid form in direct contact with the wood ensures that there is sufficient amount of acetic anhydride available for acetylation, to reach the desired acetyl content during a relatively short residence time in the reactor. It is also believed that in some embodiments, having a minimum degree of absorption in the wood elements prior to attaining a temperature of greater than 125° C., preferably greater than 135° C., ideally greater than 150° C. under acetylation conditions enables the acetylation reactor minimum residence time to be reduced whilst still achieving good product properties.

In some embodiments, the chips can be contacted with the liquid acetylation medium in a section of the reactor where the elements can be contacted uniformly, ideally a majority, preferably at least 70 wt. %, more preferably at least 80 wt. %, most preferably at least 90 wt. % or substantially all of the liquid acetylation medium added to the acetylation reactor is introduced onto the wood elements within the first 35%, alternatively within the first 25%, preferably within the first 20%, most preferably the first 15% of the residence time of the acetylation reactor.

When the wood elements have not been pre-impregnated with acetylation medium upstream of the reactor, it is particularly important to introduce the liquid onto the wood elements as soon as possible. It is equally important to avoid introducing the majority of the liquid onto the wood elements in any sections of the reactor where mixing of the elements with the liquid is constrained by the reactor design. In a particular embodiment, the wood elements are sprayed with the liquid before being introduced in any screw section of the reactor. In other embodiments, however, it may be advantageous to introduce the liquid in the screw section of the reactor. As described above, in an embodiment, the acetylation medium is supplied to the reactor in both gaseous and liquid form. The weight ratio of the acetylation medium in the gaseous form to the liquid form supplied to the acetylation reactor is preferably in the range 0.5/1 to 4/1, more preferably, in the range 0.7/1 to 3.5/1, alternatively in the ranges 2/1 to 4/1 or 0/1 to 2/1, most preferably in the range 1/1 to 3/1.

The unreacted acetylation medium after the acetylation reaction is preferably recycled and re-used in the process. This can be achieved by condensing the gas at the exit part of the reactor and separating acetic anhydride by distillation. The gas can be condensed using cooling water at a near atmospheric pressure, or using air cooling. The distillation is preferably done at atmospheric or sub-atmospheric pressure. Separated acetic anhydride can then be recycled to the reactor and separated acetic acid can be stored or used in another process, or converted to acetic anhydride by known methods.

In a following step, the reactor can be depressurized and preferably, the acetylated wood elements are discharged from the reactor. In this step, the pressure typically drops to about 0-0.1 barg. One of the features of an embodiment of the present process is that, as a result of the combined use of a vapour and liquid acetylation medium, the acetylated elements, before being depressurised, contain at least 55 wt. % liquid on dry basis of the acetylated wood elements weight. Preferably, for discharging of the acetylated material from the reactor a rotary valve set-up is used. Such a rotary valve set-up may comprise one or multiply rotary valves, with a variety of purging options through or upstream/downstream of any rotary valve. The separation between the upstream and downstream atmospheres is maintained by setting appropriate pressure differences, and if necessary purge streams, over the rotary valve set-up.

Further, the wood elements can be dried in certain embodiments. Conventional drying techniques can be used, for example blowing with a hot gas over the wood elements. Preferably, the acetylated elements are dried at a temperature in the range 150-200° C., more preferably in the range 170-190° C. Preferably, near-ambient pressure is used during drying. Drying of the acetylated wood particles may be conveniently done, e.g. by hot nitrogen, carbon dioxide or flue gas. During drying acetic acid and unreacted acetic anhydride are removed, preferably to a level of below 0.5 wt. %. Drying can be effected in multiple steps.

The dried wood elements can then be cooled down to room temperature. Conventional techniques can be used for that such as air cooling or water cooling.

As a result of the above-described process, wood elements with acetylation levels of at least 17 and up to about 25 wt. % acetyl content (AC) may readily be obtained, as measured by high-pressure liquid chromatography (HPLC). The HPLC is used to quantify the acetate ion concentration resulting from the saponification of acetyl groups. Preferably, the acetyl content is at least 18 wt. %, more preferably at least 20 wt. %, yet more preferably at least 22 wt. %.

It should be noted that in determining wood acetylation degrees, two different approaches are taken in the field. One is based on WPG (Weight Percentage Gain). WPG compares a sample before and after acetylation treatment, and as a result any substances added (and any residues still present in the wood) increase the value. WPG is explained in the following formula: WPG=($M_{increase}/M_{sample\ before\ reaction}$)× 100%. Herein M stands for mass, and $M_{increase}= M_{sample\ after\ reaction} - M_{sample\ before\ reaction}$).

The other approach, is to actually measure the acetyl content (AC). This is given as AC=($M_{acetyls}/M_{sample\ after\ reaction}$)×100%. Typically HPLC (high-pressure liquid chromatography) can be used to quantify the acetate ion concentrations resulting from the saponification of acetyl groups from the wood. From this the overall mass of the added acetyl groups after acetylation can be taken as $M_{acetyls}$.

The different results for WPG and AC can be explained with reference to the following theoretical example: a sample of, e.g., 1 g of wood is acetylated and after the reaction has a mass of 1.25 g. Thus $M_{acetyls}$ 0.25 g. The resulting WPG is: (1.25−1.00)/1.00*100%=25%. Calculated as acetyl content, AC is =(1.25−1.00)/1.25*100%=20%.

Hence, care should be taken not to directly compare degrees of acetylation expressed in WPG with degrees of acetylation expressed in AC. In the present description AC values are elected to identify the degree of acetylation.

An advantage of the process according to the present disclosure is that it allows to produce acetylated wood elements in a very efficient way, without compromising on the quality of the material and the acetyl content. The process of the disclosure does not need an impregnation step upstream of the reactor and has a particularly short residence time.

Acetylated wood elements according to the present disclosure may usefully be refined and converted to a board, such as medium density fibreboard, which will possess superior dimensional stability, durability, stability to ultraviolet light and thermal conductivity, compared with boards derived from non-acetylated wood particles. Moreover, the wood elements acetylated according to the present disclosure do not only have a high AC but also excellent physical properties such as appearance (no discoloration), fibre quality, length and strength. This can be evaluated by the properties of the end product, such as medium density fibreboards.

The following non-limiting example serves to illustrate the disclosure. In this example and throughout this specification, all percentages, parts and ratios are by weight unless indicated otherwise.

Example I

A mixture of wood chips with dimensions 2.5 cm×1.5 cm×1.5 cm consisting of 80% Sitka Spruce with 20% Loblolly Pine has been dried to a moisture content of 2.5%. These wood chips are subsequently put in a vacuum vessel and evacuated to a pressure of less than 50 mbara. After reaching this level the vessel is pressurized to 2.5 barg with nitrogen. This mixture is subsequently fed into the acetylation step. In this acetylation step the wood chips are contacted and heated by the acetylation medium consisting of acetic anhydride/acetic acid mixture with 90:10 wt:wt composition. The wood chips are contacted with liquid acetic anhydride/acetic acid mixture and heated with superheated acetic anhydride/acetic acid vapour—with the liquid spray to superheated vapour ratio being 1:2.5 wt:wt. The wood chips/acetylation medium mixture is heated to a temperature of 170° C. at a pressure of 2.3 barg by means of superheated acetic anhydride/acetic acid mixture. Oxygen content during this reaction is below 0.25 vol. %. After a residence time of 30 minutes at these conditions the pressure is released and the wood chips are transferred to the drying step, which proceeds at 0 barg. The residence time for this drying step is 70 minutes, where the chips are heated with nitrogen to a temperature of 170° C. This process resulted in acetylated wood chips with an acetyl content (AC) of 22.5% and a residual acid content of 0.5 wt. %.

Example II (Comparative)

A mixture of wood chips with dimensions 2.5 cm×1.5 cm×1.5 cm consisting of 80% Sitka Spruce with 20% Loblolly Pine has been dried to a moisture content of 2.5%. These wood chips are pressurized to 2.5 barg with nitrogen, without an oxygen removal step. This mixture is subsequently fed into the acetylation step. In this acetylation step the wood chips are contacted and heated by the acetylation medium consisting of acetic anhydride/acetic acid mixture with 90:10 wt:wt composition. The wood chips are contacted with liquid acetic anhydride/acetic acid mixture and heated with superheated acetic anhydride/acetic acid vapour—with the liquid spray to superheated vapour ratio being 1:2.5 wt:wt. The wood chips/acetylation medium mixture is heated to a temperature of 170° C. at a pressure of 2.3 barg by means of superheated acetic anhydride/acetic acid mixture. Oxygen content during this reaction reached values over 5 vol. %. After a residence time of 30 minutes at these conditions the pressure is released and the wood chips are transferred to the drying step, which proceeds at 0 barg. The residence time for this drying step is 70 minutes, where the chips are heated with nitrogen to a temperature of 170° C. This process resulted in acetylated wood chips with an acetyl content (AC) of 22.1% and a residual acid content of 0.6 wt. %. The chips were heavily darkened in contrast to the chips from Example I.

All references cited in this specification, including without limitation, all papers, publications, patents, patent applications, presentations, texts, reports, manuscripts, brochures, books, Internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

Although embodiments of the disclosure have been described using specific terms, apparatus, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

What is claimed is:

1. Method for continuous acetylation of wood elements, wherein the acetylation is conducted with an acetylation medium under wood acetylation reaction conditions at a pressure of at least 1.5 barg in a substantially oxygen free environment, wherein the method comprises:
a) providing wood elements in a batch vessel;
b) batchwise removing oxygen from the wood elements in said batch vessel using vacuum, providing oxygen-removed wood elements;
c) thereafter bringing the oxygen-removed wood elements under an oxygen-free inert atmosphere;
d) transferring the oxygen-removed wood elements under said oxygen-free inert atmosphere from said batch vessel into a continuous acetylation reactor;
e) after the oxygen removal and before acetylation, bringing the oxygen-removed wood elements under increased pressure of at least 1.5 barg; and
f) treating the wood elements with an acetylation medium in said continuous acetylation reactor under wood acetylation reaction conditions, at a pressure of at least 1.5 barg and under an oxygen content in the acetylation reactor that is less than 0.8 vol. %, wherein at least 80 wt. % of the acetylation medium is supplied to the wood elements after the wood elements are at a pressure of at least 1.5 barg.

2. The method according to claim 1, wherein the oxygen content of the wood elements fed to the acetylation reactor is less than 0.8 vol. %.

3. The method of claim 1, wherein the step of batchwise removing oxygen from the wood elements involves applying a vacuum with pressure of 100 mbar or less to the wood elements, and wherein the wood is brought under an increased pressure of at least 1.5 barg after the step of removing oxygen and before acetylation.

4. The method according to claim 1, wherein the acetylation medium is supplied to the reactor in both gaseous form and liquid form.

5. The method according to claim 4, wherein the weight ratio of the acetylation medium in the gaseous form to the liquid form supplied to the acetylation reactor is in the range 0.5/1 to 4/1.

6. The method according to claim 1, wherein the wood elements have a size of a height and width from 0.1 cm to 3 cm, and a length of 1 to 7 cm.

7. The method according to claim 1, wherein the residence time in the continuous acetylation reactor is under 1 hour.

8. The method according to claim 1, wherein the continuous acetylation reactor comprises acetylation reaction zone (A), wherein wood elements in the continuous acetylation reactor have an average temperature, and wherein the wood elements are introduced into the acetylation reaction zone (A) at a temperature within 15° C. of said average temperature, wherein the acetylation reaction zone (A) has a pressure of at least 1.5 barg and wherein the wood elements have a residence time in said acetylation zone (A) of under 1 hour.

9. The method according to claim 1, wherein the batch vessel is a hopper with a continuous discharging device.

10. The method according to claim 9, wherein:

the batch vessel is a screw; and the wood elements are continuously discharged from the screw at a bottom of the hopper to a rotary valve set-up.

* * * * *